United States Patent [19]
Strength et al.

[11] Patent Number: 5,899,367
[45] Date of Patent: May 4, 1999

[54] AUTOMATED DISPENSER

[75] Inventors: Vernon Edward Strength, Long Beach; George John Sherry, Yorba Linda; Robert Wesley Adkisson, Costa Mesa, all of Calif.

[73] Assignee: McDonnell Douglas Corporation, Huntington Beach, Calif.

[21] Appl. No.: 08/690,570

[22] Filed: Jul. 31, 1996

[51] Int. Cl.⁶ .............................. B67D 5/42; B67D 5/08; G04C 23/00

[52] U.S. Cl. .................. 222/386.5; 222/399; 222/644; 222/650; 222/642; 222/61

[58] Field of Search .................. 222/95, 386.5, 222/399, 644, 650, 642, 61

[56] References Cited

U.S. PATENT DOCUMENTS

| | | | |
|---|---|---|---|
| 3,782,334 | 1/1974 | Leon | 119/54 |
| 3,979,023 | 9/1976 | Hartley | 222/61 |
| 4,372,354 | 2/1983 | Moore | 222/399 |
| 4,498,424 | 2/1985 | Leuschner | 119/51 |
| 4,678,107 | 7/1987 | Ennis, III | 222/386.5 |
| 4,836,409 | 6/1989 | Lane | 222/386.5 |
| 4,938,396 | 7/1990 | Shannon | 222/642 |
| 5,096,092 | 3/1992 | Devine | 222/95 |
| 5,129,361 | 7/1992 | Deutsch | 119/51.12 |
| 5,163,380 | 11/1992 | Duffy | 119/15 |
| 5,188,337 | 2/1993 | Mertens et al. | 251/129.17 |
| 5,271,534 | 12/1993 | Fillmore et al. | 222/386.5 |
| 5,366,117 | 11/1994 | Mesenbring et al. | 222/642 |
| 5,398,643 | 3/1995 | McElreth | 119/51.11 |
| 5,673,818 | 10/1997 | Kaneski et al. | 222/386.5 |

*Primary Examiner*—Andres Kashnikow
*Assistant Examiner*—Keats Quinalty
*Attorney, Agent, or Firm*—Alston & Bird LLP

[57] ABSTRACT

An autonomously operated automated food dispenser provides sustenance to one or more animals at prescribed intervals. The dispenser is portable and suitable for use for animals in space vehicle life support systems. A microcontroller controls operation of the outlet valve of a food reservoir that contains a food paste maintained under pressure by a pressurized gas source. Predetermined volume of food paste are extruded through the outlet upon the microcontroller's command. The food cannister is characterized by a novel two part assembly and houses a rolling diaphragm. Pressurized gas is applied to the bottom of the diaphragm, allowing the diaphragm to roll against the food paste, when the outlet valve is opened.

22 Claims, 5 Drawing Sheets

AUTOMATED DISPENSER

FIELD OF THE INVENTION

This invention is a self-contained, microprocessor-controlled dispenser for automatic, quantitative delivery of uncontaminated food paste to an animal in accordance with a defined feeding schedule and/or upon the animal's demand. The specific application of the invention shown in the provided drawings is designed during space vehicle flight as well as in terrestrial settings.

BACKGROUND

The viability of long-term human habitation of space requires study of the physiological and behavioral effects of the space environment on the human body. While some effects are known from flight studies performed with astronaut subjects, many effects cannot be studied without subjecting astronauts to discomfort or danger. For this reason, studies of the effects of the space environment are routinely performed using animals such as rodents and birds as subjects.

Experimental animals are housed in habitats that provide all life support requirements including food and water. Habitats often have science accommodations provisions for measuring the amount of food and water ingested by the animals, permitting study of the relationship of ingestion to various physiological and behavioral effects. However, it has proven difficult to meter water delivery in space, and a significant amount is spilled. It is even harder to meter ingestion of dry food because of high and variable amounts of wastage of the crumbs.

Habitats may have separated dry food and liquid water delivery systems, or a paste providing both food and water may be delivered from a single system. Paste diets offer to space research the advantages of a single delivery system for both food and water, less waste of both food and water, better control of delivery, better contamination control, and more accurate quantification of food ingestion. However, no satisfactory automated dispenser for paste diets is available.

One paste feeding apparatus for rodents previously developed by NASA is a ground unit that periodically fills a trough for group feeding of animals. This ground unit is not readily adaptable to space vehicle implementation, since it is too bulky, the fluid dynamics of trough filling in micro gravity are not known, and the trough design leaves a large surface area of paste exposed to contamination and to drying, which reduces the ratio of water to food ingested by the animal. In addition, there is no provision to monitor the quantity of food ingested.

A second device, also never deployed in space, is pie-shaped with pie slice-shaped compartments filled with food paste. An opening in the cover that is moved to expose a three day supply of food at one time. This device has the same drawbacks as designs based on troughs.

The Russian Space Agency (RSA) is understood to have tried a series of paste feeder devices based on the trough concept that are generally reputed to be unsuccessful and fraught with severe contamination problems. The designs have evolved to improve bioisolation, and recently the RSA flew a device with several external bladders filled with clean paste that are periodically squeezed by cosmonauts to deliver to the specimens aliquots of food. This device does not provide automatic delivery or quantification of ingestion, and if large aliquots are delivered to minimize crew involvement then uneaten food sits for extended periods and is subject to contamination.

Accordingly, an object of the present invention is to provide a food dispensing system that is suitable for autonomous unattended operation in space vehicles.

Another object of the invention is to provide an automated food dispenser that dispenses individual food servings for each animal individually only at prescribed mealtimes or, alternatively, on demand, and in a prescribed quantity.

A further object of the invention is to store sterilized food in bulk for long periods and to dispense uncontaminated food throughout that period in precisely measured amounts.

An additional object of the invention is to provide an automated food delivery system that is portable, is of simple construction and that permits quick and easy change in schedules and quantities of food and water dispensed.

And an ancillary object is to provide an automated dispenser that can be easily expanded to include dispensing of a variety of consumable substances, including food, medicine and water.

To meet the principal objectives the present invention uses food that has been powdered or minced and mixed with water to form a paste. Paste food provides the most convenient and flexible means of providing the full nutritional needs, including water, of humans and animals. Paste is easily sterilized within its packaging container by irradiation, and then stored for extended durations without danger of microbial spoilage. Many persons have seen news film footage showing astronauts squeezing paste foods from tubes directly into their mouths.

A regimen of food paste offers clear advantages over solid food for animal experimental subjects. Typically less than half the food and water storage volume is required. Food consumption is more accurately determined because there is less waste. Paste can be dispensed to an accuracy of ±0.10 gram food per day and ±0.3 ml water per day. Food is stored in a reservoir separately from the animal cage, providing bioisolation of the food from animal wastes. The animal's requirements for both food and water can be met by paste composed of the proper ratio of food to water, reducing the number of delivery systems by half and decreasing dispenser cost, volume and complexity of delivery mechanisms.

The need for reliable automated food dispensers for space applications is clear, but terrestrial applications are also applicable to the care and feeding of pet animals. Pet owners who must be absent from home must board their animals with a kennel or veterinarian, have neighbors attend their animal's needs, or travel with their pets, all of which stress the animal. With the effective and reliable automated food dispenser the animal can be regularly fed in its familiar home surroundings, greatly reducing the amount of attention required of neighbors.

SUMMARY OF THE INVENTION

In accordance with the foregoing objects an automated dispenser of consumables includes a storage reservoir containing food paste or other consumable, a pressurized gas inlet and a valve controlled outlet. Electronic programming of food delivery is controlled by a digital micro-controller to set the operating conditions and the times and durations of the outlet valve. With a gas pressure source applied to the containers inlet a bias force is applied to the food paste. The micro-controller commands the outlet valve to open for a predetermined interval at an appropriate time and, in response, food paste is extruded from the container's outlet under the force exerted by the gas. The food paste may be moved directly into a feed bowl associated with the unit. The entire unit may be supported within a rack or specimen case for easy transportation. The electrical requirements of the microprocessors and valves may be served by conventional battery cells, permitting autonomous operation.

In a more specific aspect the controlled valve is a pinch type valve. As an additional feature to the invention, the food reservoir is constructed of two open ended container sections whose open ends are joined together supporting a rim edge of a rolling diaphragm supported within the reservoir, defining an inverted sack. The food paste is contained within the sack in one container section. The other container section, into which the pressurized gas is introduced, has no contact with the food paste.

In an additional aspect the dispenser includes a demand switch, whereby an animal may initiate a request for food, and a visual indicator to illuminate to indicate food availability. Suitably, such demand switch and indicator are formed in a novel assembly that is positioned within the animal's feeding bowl.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE PREFERRED EMBODIMENTS

Figure 1:
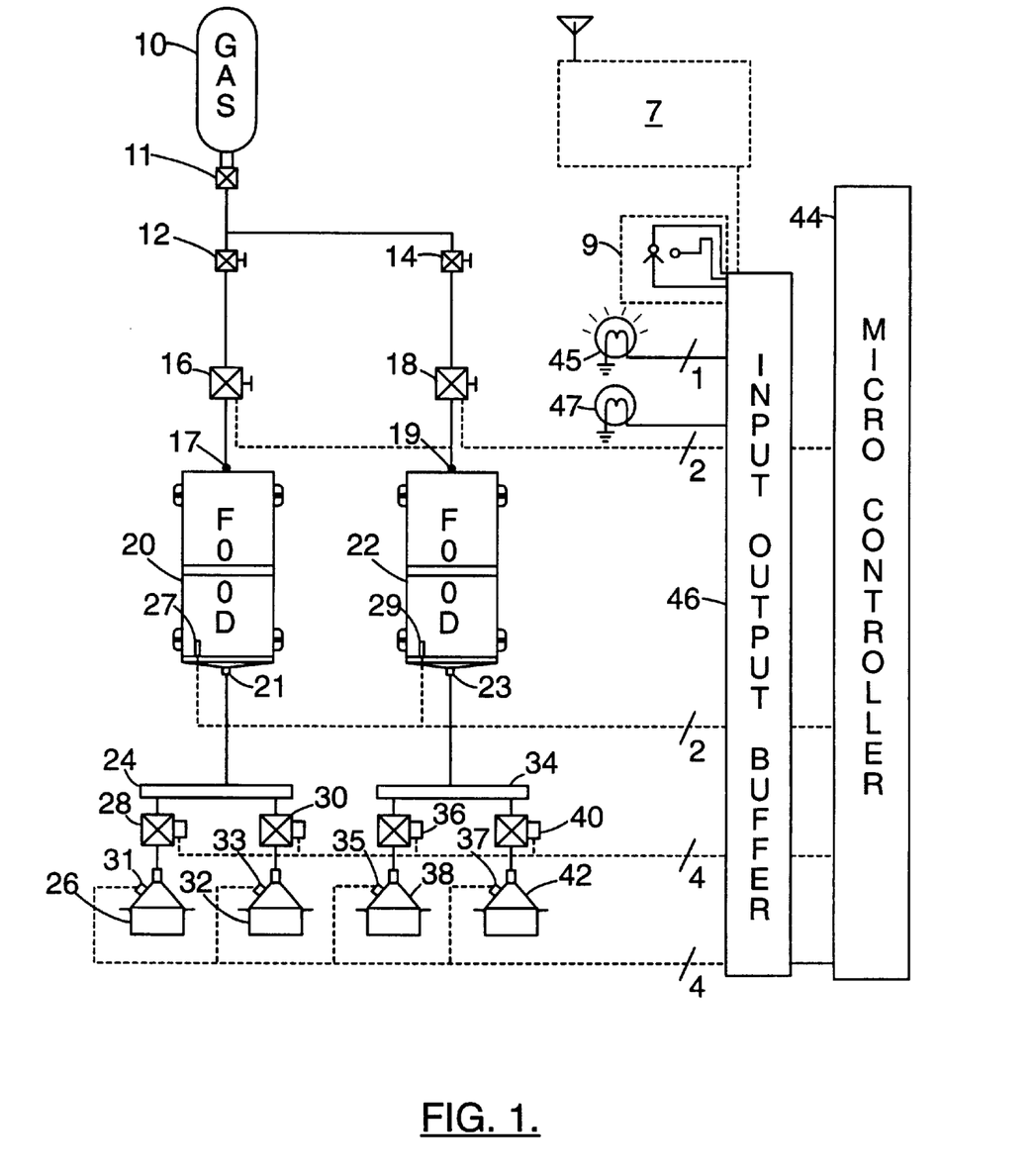
FIG. 1 schematically illustrates a multi-station automated food dispenser constructed in accordance with the invention.

A multi-station automated food dispenser constructed in accordance with the invention is illustrated schematically in FIG. 1 to which reference is made. A canister or reservoir 10 of pressurized gas and its release valve 11 connects via two branch conduits to respective pressure regulators 12 and 14 and pressure relief valves 16 and 18, and through respective conduits to the respective gas inlets 17 and 19 of a pair of food reservoirs 20 and 22. The food reservoirs contain a sterilized food paste formed of food and water. As an example, a satisfactory food paste is formed of two parts of feed powder and one part water mixed together. Considering first food reservoir 20, a food outlet 21 therein connects via a conduit to a manifold 24. Separate conduits connect that manifold's outlets to a first feed bowl 26 via a dispensing valve 28 and to a second feed bowl 32 via another dispensing valve 30.

The conduits to the inlet end of the reservoirs contain air under pressure, and hence are preferably formed of stainless steel tubing or rugged hose that can withstand pressure. The conduits following the food outlet are, suitably silicon rubber tubes, and dispensing valves, such as valve 28 are suitably, conventional electrically operated "pinch" valve.

A like arrangement distribution arrangement is provided with respect to the second food reservoir 22, via pressure regulator 14, shut-off valve 18, to pressurized gas inlet 19, and from the reservoir's food outlet 23, via manifold 34 in parallel to dispensing valve 36 and feed bowl 38 and to dispensing valve 40 and feed bowl 42. The individual feed bowls are contained in individual animal cages, not illustrated, so that an individual rodent's meal is assured against predation from the other rodents. This prevents the more aggressive of the rodents from stealing another's meal and becoming a fat rat.

The preferred embodiment includes food level sensors 27 and 29 for the two respective reservoirs. Visual indicators 45 and 47 serves to indicate a respective empty reservoir. Each of the four bowls further includes a touch responsive switch and indicator assembly 31, 33, 35 and 37.

A micro-controller 44, including its associated input/output buffer or interface 46, controls the operation of the system. Leads to the electrically operated elements and sensors is represented in dash line. As is the drawing convention, the number of electrical leads in a cable or data or control bus extending from the controller buffer is represented by a short slash line and, adjacent thereto, a number. That number is the number of lines in the cable or bus. The micro-controller connects via an input-output buffer 46 individually to each of the shut off valves, 16 and 18, represented as two leads by the forward slash 2 mark, the food dispensing valves 28, 30, 36 and 40, and touch operated switches 31, 33, 35 and 37. A mode switch 9 connects to the micro-controller to allow one to change the micro-controller's program mode. For some space borne applications, an RF receiver 7 is included and connects to a micro-controller input to serve as a data link to a ground based station and permits the ground based station to change the program mode remotely.

Micro-controller 44 and its associated buffer 46 are of conventional structure and is formed of a programmed digital processor that operates in accordance with a stored program, the software. As programmed, the controller monitors the various processor inputs, processes those inputs, and provides the appropriate outputs called for by the stored program. The micro-controller may be of the form of a general purpose digital computer in which the program is installed as software or, preferably, is the familiar microcomputer or micro-controller on a chip in which the program is permanently installed in Read Only Memory, ROM, or in electrically alterable Read Only Memory, EPROM. For autonomous operation the micro-controller and the associated electrically operated valves, controlled thereby, are battery powered.

Briefly, in operation in one mode, the micro-controller energizes the outlet valves at prescribed intervals and for a predetermined interval each time. The pressurized air introduced into the reservoir creates a force on the food. When the micro-controller opens the outlet valve, under that force, food paste is thereby squeezed out, extruded through the food outlet. In another mode, as represented by toggling switch 9 to the alternate position, or as set via the remote control receiver 7, the micro-controller energizes the lamp included in the touch switch assembly, 31 as example, in bowl 26, and should the animal respond by operating the associated touch responsive switch 31, it receives a reward of food. That food is dispensed in the same manner as before. The foregoing operation is better described hereafter in greater detail, after first considering the description of a preferred food reservoir construction, next considered.

In addition to the basic executive program permanently installed on the semiconductor chip, the software program typically includes a schedule program specifying the intervals at which each bowl is to be filled, the measure of food so dispensed, and other parameters related to the amount and frequency of food each rodent is to receive. The software may include programs for providing Pavlovian conditioning to the animals, as by lighting the lamp in the food bowl prior to food delivery on several trials, then determining the animals response on trials in which food does not follow the lighting of the lamp.

The feed schedule program may also allow for dispensing on demand. This condition can be used for instrumental condition when the rodent operates the touch responsive switch and dispensing a measured amount of food paste. Alternatively, complete schedules of reinforcement may be scheduled with feeding "opportunities" at predetermined intervals, or with food available only when the rodent operates the respective touch responsive switch in certain patterns. Conditional discriminations may also be programmed in conjunction with the indicator light.

It is appreciated that the foregoing elements are mounted in a rack or animal cage to form a self-contained unit that may be easily picked up and carried from one location to another as desired.

Figure 2:
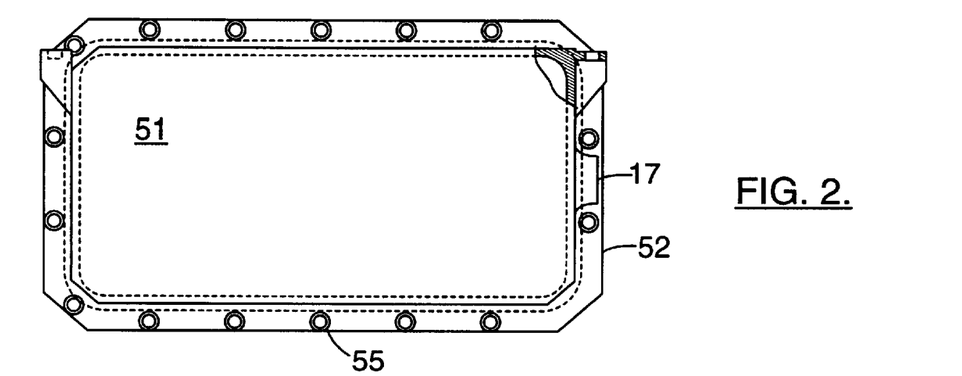
FIGS. 2, 3 and 4 illustrates a food reservoir used in the embodiment of FIG. 1 in top, side and bottom views, respectively.
Figure 3:
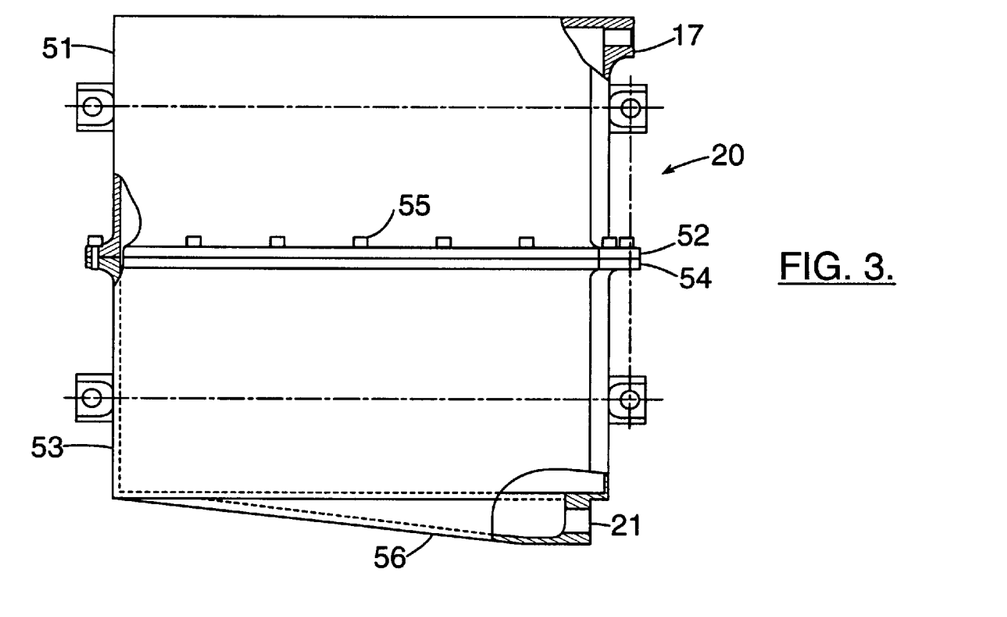
Figure 4:
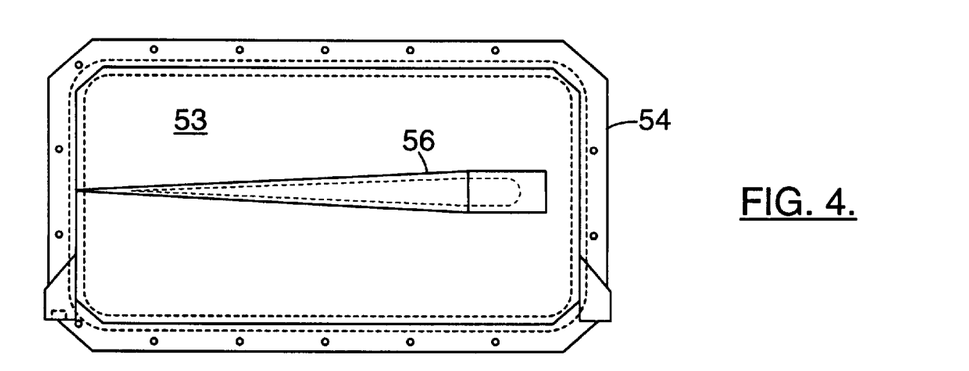
Figure 5:
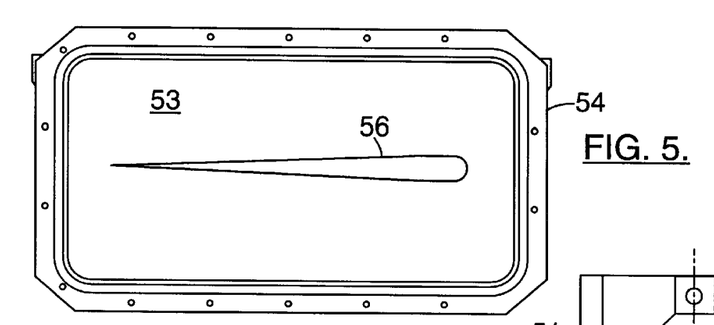
FIG. 5 is a view of the bottom reservoir portion of FIGS. 2–4, as viewed from the reservoir portion's open end.
Figure 6:
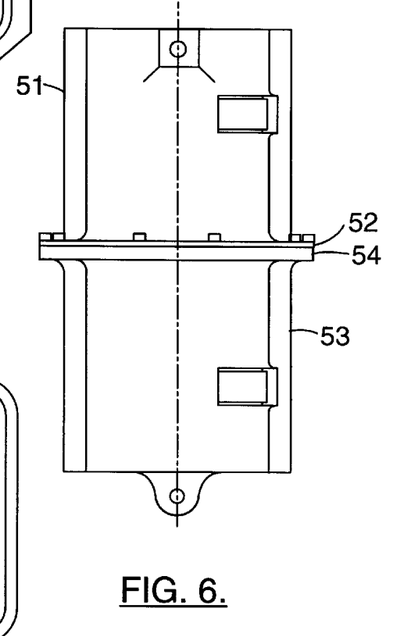
FIG. 6 is a right side view of the reservoir of FIGS. 2–4.

Food reservoir 20, which is believed to be of novel construction, is illustrated in FIGS. 1 through 9. Referring first to FIGS. 2 through 4, showing the reservoir in top, front side section, and bottom views, respectively, it is seen that the reservoir is generally rectanguloid in shape and is formed of two smaller open sided rectanguloid parts 51 and 53 that are joined together in facing relationship at their open ends. The open end of each section is bounded by an outwardly projecting flange 52 and 54, respectively, and the two parts are joined face to face, suitably by bolts 55, to form the food storage reservoir or reservoir 20.

At its upper end section 57 contains the gas inlet 17. The second section 53, the lower section in this figure, contains a groove 56 in the floor. As illustrated in the top view of that section in FIG. 5, looking down into the upwardly facing open end, the groove in top view is of a long relatively thin triangle, having a small angle at its apex, widening out at the base end, resembling a tear drop in shape, at which location the groove is deepest. The short narrow wall portion joining the bottom of the groove with the flat wall portion of the section bottom includes the food outlet 21 through which the food paste is dispensed. This serves as a causeway, ramp or slide for food to exit from this end of the section through the food outlet 21. The tapered causeway ensures that the food has a place to escape as the stiffened closed end of the diaphragm, serving some what as a piston, descends close to the bottom of the section. In practical use, the tapered causeway holds no more than two per cent of the food.

Figure 7:
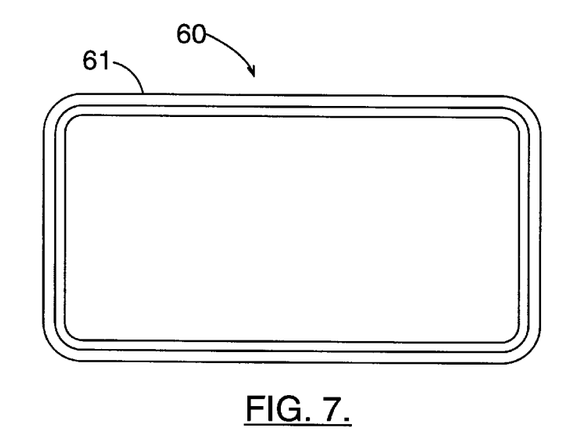
FIGS. 7, 8 and 9 show the diaphragm used in the food reservoir of FIGS. 2–4 in top, front section and side section views, respectively.
Figures 8, 9:
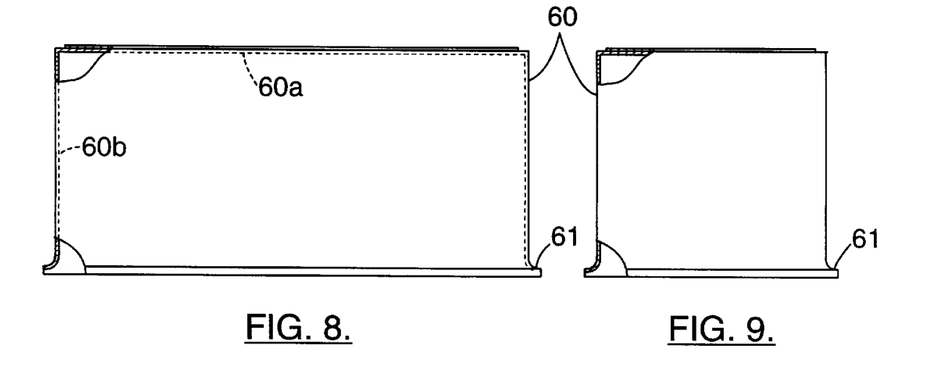

A diaphragm is fitted within the reservoir. As an additional feature to the invention, the diaphragm is the type of diaphragm that is referred to as a rolling diaphragm, which is illustrated in FIGS. 7, 8 and 9 in top, front side, and right side views, respectively. The diaphragm is three dimensional in shape and resembles a large overturned open sack. It is rectanguloid in shape and is sized to telescopically fit internally within the first reservoir section 51. The diaphragm further includes a rounded outwardly projecting lip or bead 61 circumscribing the diaphragm's open end. That bead serves as a ring seal as hereafter described.

The diaphragm is thin walled and is formed of a pliant material, suitably food compatible silicone as example. That material is rigid enough to be self supporting, as in the configuration illustrated, and also possesses some elasticity. In other embodiments a more limp material may be substituted in the diaphragm or the silicon made thin enough to be limp in character, eliminating the self supporting aspect of the diaphragm. Since food is inserted in the diaphragm, the material should be of "food grade", that is, it has been shown that the material does not contaminate food.

When assembled together, the food paste is confined within the sack created by the diaphragm and the lower container portion 53. The upper container portion 51 thereby is not placed in contact with food.

Figure 10:
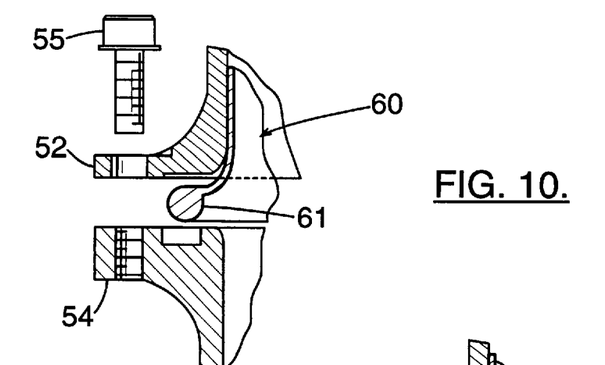
FIG. 10 is a partial section view of the flange and diaphragm edge portion prior to assembly of the food reservoir.
Figure 11:
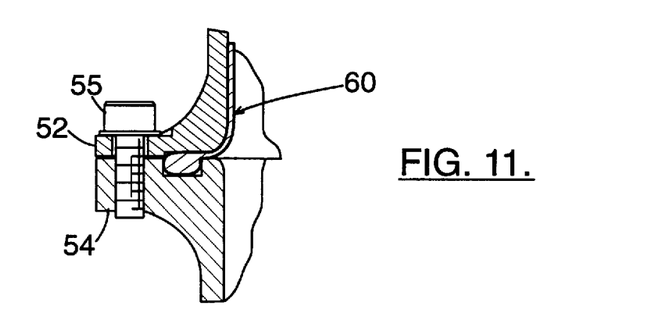
FIG. 11 is a like partial section view showing those same elements as fully assembled.
Figure 12A:
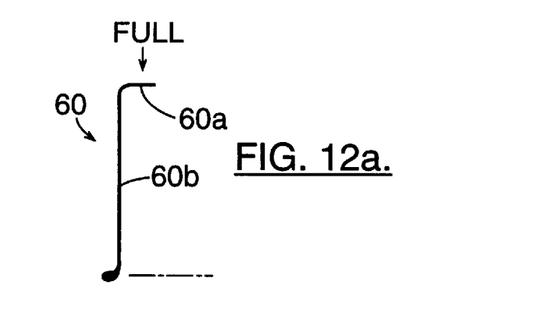
FIGS. 12a–12e are pictorial partial views of the diaphragm section to illustrate the operation of the rolling diaphragm used in the reservoir embodiment of FIG. 2.
Figure 12B:
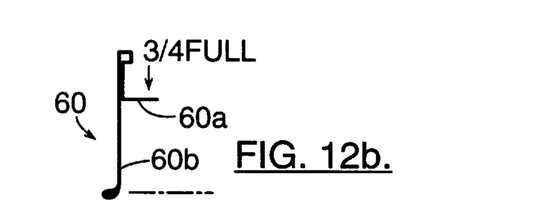
Figure 12C:
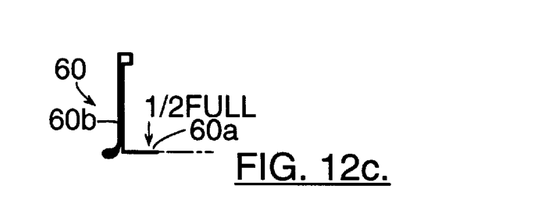
Figure 12D:
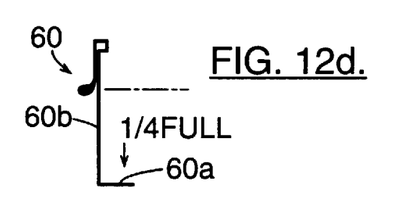
Figure 12E:
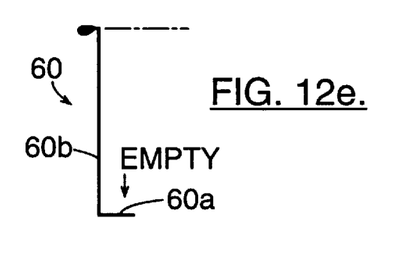

As illustrated in the partial section views of FIGS. 10 and 11, respective flanges 52 and 54 contain recessed portions circumscribing the face of the flanges, in which to sandwich or seat the diaphragm's bead 61. When joined together by bolts 55, the bead is compressed within the seat and forms a leak-proof seal between the two reservoir sections. The foregoing junction between flange and diaphragm also supports the diaphragm in the inverted position internally within the chamber defined by the upper reservoir section 51.

In this embodiment, the one reservoir section is mounted over the other and reference has been made to upper and lower, vertical and horizontal for convenience. However, as the foregoing operation does not depend on the effect of gravity in its operation, it is understood that the invention is not limited to the foregoing orientation or to that descriptive language. The food reservoir may be oriented horizontally, instead of vertically, in which case the two sections would be placed side by side, one to the right and one to the left. Those and other variations are seen to incorporate and fall within the scope of the invention.

The rolling diaphragm is one in which its walls fold over upon itself. In operation, the closed end of the diaphragm is forced to move along the diaphragms axis toward the open end, and, eventually inverts as the closed end is moved through that open end. In two dimensions, this effect is akin to pulling a bed sheet by its end toward the foot end of the bed, wherein portions of the bed sheet are folded over one another and dragged down, ultimately being pulled past the foot of the bed at which the end of the bed sheet is fastened.

To aid the lay person's understanding, the roll over action of the diaphragm is illustrated in the partial views of FIGS. 12a through 12e. Those views show the closed end 60a and the side wall portion 60b in various stages as the closed end is pulled past the location at which the open end of the diaphragm is anchored.

For operation, with sterilized food paste installed in reservoirs 20 and 22, valve 11 and the other serially connected valves to the pressure reservoir are opened allowing pressurized gas to extend through the conduits and inlet 17 into the reservoir to create a high pressure within the reservoir that creates a force on the food. Specifically, the pressure biases the closed end 60a of diaphragm 60 in each reservoir. The power supply is turned on, allowing the microprocessor 44 to initialize and set the state of each of the electrically operated valves. At a prescribed point in time set by the micro-controller's software program, the micro-controller issues a command to operate one or more of the valves, such as food outlet valve 28 at feed bowl 26. The valve opens and food paste is expressed from manifold 24 into the bowl.

The computer allows the valve to remain open for a prescribed interval and, upon the lapse of that interval, causes valve 28 to re-close. A predetermined amount of food is thereby dispensed through outlet 21, and, from manifold 24, dispensing valves 28 and 30 into the associated feed bowls.

The rolling diaphragm is ideal for maintaining a constant pressure on a volume of confined material. Since the pressure or force on the diaphragm is a known level, the rate at which food is dispensed from the food outlet into the bowl is known through pre-calibration, then the volume of the food dispensed is readily determined by multiplying that known rate by the duration in which the respective outlet valve 28 is open. Those determined periods are known to the programmer who sets the duration in preparing the program. Assuming the first meal is breakfast, the foregoing process is repeated by the apparatus for each of lunch and dinner. That same process is independently controlled at reservoir 22, and at any additional station that one might add to the system.

Typical microprocessors contain a large number of available inputs and outputs that exceed in number by far the number of feed stations one might choose to employ in a particular dispensing system.

Eventually the food is depleted; the reservoir emptied. That condition is signaled to the computer by the feed level sensor 27, which detects contact with the closed end of the diaphragm stiffening plate abutting the floor of the reservoir. The sensor's output is detected by the micro-controller, and the micro-controller signals the depletion of food via an appropriate alarm message or signal via an RF transmitter, not illustrated, to the land based spaced vehicle control center. When used on land, the micro-controller instead would operate an alarm indicator, such as lamps 45 and 47, alerting an attendant to refill the reservoir before the animal goes hungry.

To replenish the reservoir, the food paste, for one, may be inserted within the reservoir through a passage in the food outlet 21. This is accomplished with any kind of pressure operated device capable of forcing the food paste into the reservoir, such as a "grease gun" type of mechanism. Shut off valve 11 is closed, pressure relief valve 16 is opened, removing the pressure on the diaphragm 60. The food paste filled grease gun is connected and pumped, expressing food into the reservoir. The diaphragm is forced back up to the top of the reservoir by the force of the food paste as the lower reservoir section and diaphragm fills with food. By making certain that the food pump does not contain any air bubbles, one avoids introducing air bubbles into the system. There are no air bubbles located in the diaphragm because it is in a collapsed condition. The diaphragm is essentially limp and cannot return to its original position without application of pressure.

If not previously sterilized, the food and reservoir are sterilized, preferably, by exposure to a radioactive source. The atomic radiation has the ability to penetrate the metal reservoir and the food, destroying any bacteria as could cause food decay.

Figure 13:
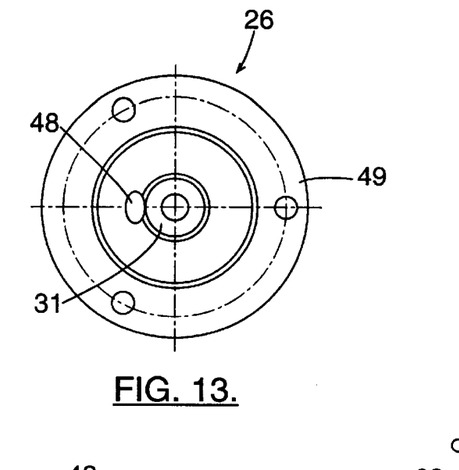
FIGS. 13 and 14 illustrate a food bowl used in the embodiment of FIG. 1 in top and side section views, respectively.
Figure 14:
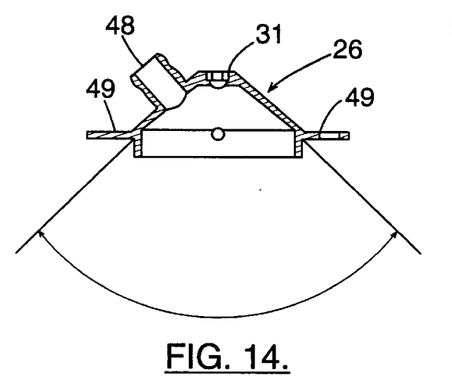

One preferred form of feed bowl is illustrated in top view and in side section in FIGS. 13 and 14, respectively. The bowl contains a concavely shaped region for receiving the food paste and a tubular passage 48 extends through a wall of that region to provide a food passage for extrusion of the food paste into the bowl. The tubular passage is connected to the manifold 24 of FIG. 1 by means of any standard elastomeric tubing, not illustrated. A flange 49 is provided to connect the food bowl to an appropriate support within the rack. In the preferred form the animal demand switch and confirmation lamp assembly, earlier briefly described in FIG. 1, is also positioned within this wall. As shown in FIG. 13, switch and lamp assembly occupies a central position within the bowl.

Figure 15:
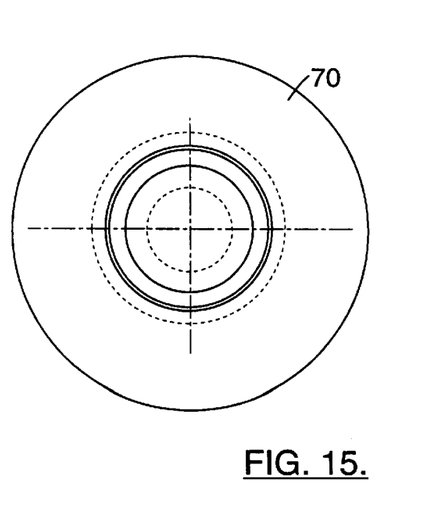
FIGS. 15 and 16 illustrate an embodiment of a membrane switch and indicator lamp assembly incorporated within the food bowl of FIG. 13.
Figure 16:
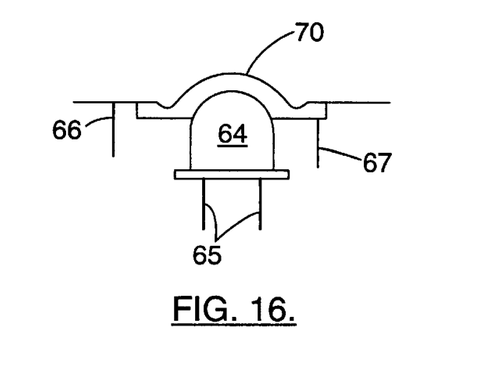

The details of the switch and lamp assembly, which are also believed novel in structure, is better illustrated in FIGS. 15 and 16, illustrating the assembly in partial top view and in a partial side section view, respectively. The assembly includes a thin walled flexible plastic membrane 70, containing a bulbous central portion and a peripheral rim portion with a circular groove between to provide greater flexibility. A light emitting diode type indicator lamp 64 is located immediately behind the membrane supported by conventional brackets, not illustrated. The power leads 65 for the lamp are connected via suitable cabling to the appropriate interface outputs for the micro-controller. The membrane is at least translucent or transparent in character, as desired, so that light from the indicator lamp, when energized, is able to shine through the switch membrane and signal the animal confirmation. A portion of the bottom side of the membrane is plated with or has attached a conductive metal 66, which serves as one switch contact. The metal is connected via an electrical tab, integrally formed with the former contact, to one electrical circuit lead to the microcomputer. A second washer shaped metal conductor 67 is mounted over the rounded head of the indicator lamp and serves as the second switch contact. The latter conductor also contains a conductive metal tab integrally formed therewith. The tab is connected to the remaining circuit portion of the microcomputer. By manually depressing the center of membrane 70 the two electrical contacts contact one another and complete the electric circuit to the micro-controller, thereby signifying operation of the animal's demand switch to the micro-controller.

Depending upon the nature of the particular food paste and the humidity in the environment in which the dispenser is used, the food paste residing in the end of passage 48 in the food bowl of FIG. 14 could dry and harden through contact with the air, much like the end of a loaf of French bread. Depending on the material used for passage 48, and the level of gas pressure used in the dispenser, that hardened food paste could stick to the passage walls and clog the passage. In such circumstances, a form of self unclogging form of feed bowl is used. That alternative feed bowl is illustrated in FIGS. 17 and 18 to which reference is made.

Figure 17:
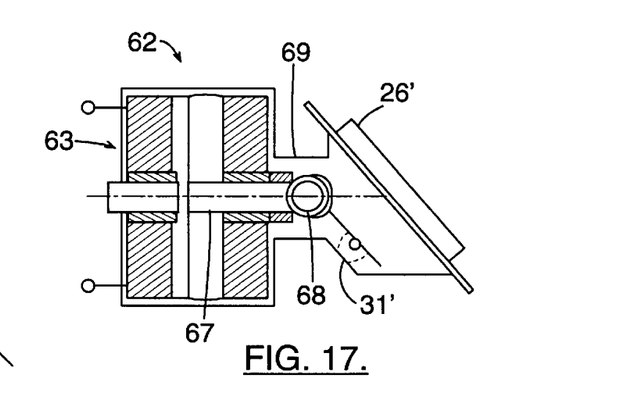
FIGS. 17 and 18 respectively show a section view of another food bowl having a self cleaning feature used in other embodiments of the invention and a pictorial perspective view of that alternative food bowl assembly.
Figure 18:
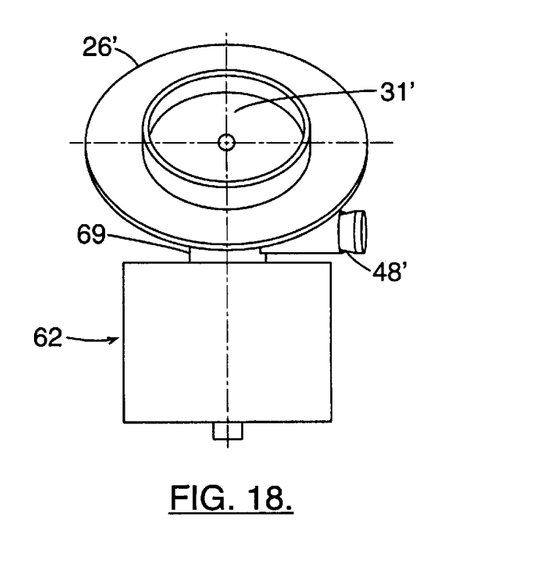

As shown in FIG. 17, the food bowl 26' forms an assembly with a solenoid 62. As shown in a pictorial perspective view in FIG. 18, food bowl 26' contains the same membrane switch 31' as in the preceding embodiment. The solenoid contains an electromagnetic coil 63 and an actuator or plunger 67. The support member 69 joining the food bowl to the solenoid internally provides a number of passages and serves as a T-junction block for those passages. The solenoid's plunger is situated in a passage that is axially aligned with a like diameter short passage, not numbered, through the wall of food bowl 26', the latter of which corresponds to passage 48 in the embodiment of FIG. 14. Another passage 68, is located at right angles to the preceding passages and intersects those passages.

Passage 68 is connected by conduit tubes to the dispensing valve in the dispenser of FIG. 1. As in accordance with the foregoing discussion of operation, food paste from the dispensing valve is pushed through passage 68 and, in the T-junction, takes a right turn and passes through the food bowl's wall to enter the food bowl.

If and when it is determined that the passage entering the food bowl has clogged, electrical current is supplied to the leads of coil 63. Actuator coil 63 is energized and magnetically forces the plunger through the passage, moving to the right as illustrated in FIG. 17, and into the passage that extends through the bowl wall. This force concentrated at that food exit forces out the dried food. The coil is de-energized and the plunger is withdrawn. This leaves the moist food at the end of passage 68 ready to be forced into the feed bowl under force of the rolling diaphragm earlier described.

The foregoing self cleaning operation is suitably controlled by the microcomputer as well through operation of a cleaning mode program. That cleaning mode program may be actuated by remote control, as by an RF link to the ground based station, earlier described, or may be operated by a separate toggle switch, should a person be in attendance at the site.

The foregoing dispenser embodiment of FIG. 1 employs a standard gas cartridge of the type and size used in gas pressure operated BB guns, which allows the dispensing unit to be self contained as desired for space vehicle use. However, for land based use, one might instead chose to use an electrically powered pump to pressurize air within a cylinder. The pump would be powered by the AC house current and would include a pressure sensor to activate the pump when the air pressure within the cylinder falls below the desired level.

One apparent land based use for the apparatus is to allow a consumer to leave the person's pet dog or cat at home unattended while ensuring that the pet receives regular meals at prescribed intervals. The pet's food is mixed with water in a paste and installed within the reservoir as in the earlier case.

If desired one may also provide the animal with medicated food. In such an arrangement a separate reservoir containing a medicated food paste is connected in a like arrangement of valves and conduits to that illustrated for reservoir 20, but whose food outlet connects to the same manifold as the associated food reservoir, as example for stations 26 and 32, manifold 24. This associates one of the medicated food containers with one of the regular food containers.

The computer may be programmed to alternate food dispensing to stations 26 and 32 from the source of regular food to the source of medicated food in accordance with a schedule defined in the software program. Alternatively, the activation of the medicated food source may be accomplished from a remote location, such as the ground based space vehicle control center, when personnel determine that the animal at that feed station has a particular problem requiring medication. Such a system is easily implemented through use of a remote command receiver, not illustrated, that sends an override signal to another computer input sensed by the program. When the program detects an override input, only then does it branch the program to the control of the medicated food container.

Similarly, the dispenser may be equipped with a supplementary source of water. The water would be included within a food reservoir with associated control valves and the like shown for one of the food reservoirs in FIG. 1. In outer space, fluids, being "weightless" like everything else, should not run out of the reservoir, as it would on earth. The water is also dispensed by rolling of the reservoir's rolling diaphragm, which moves under force of the gas pressure when the outlet valve is opened by the micro-controller.

As those skilled in the art recognize, the dispenser can be converted to single station operation for a single animal by simply removing the extra food reservoir and bowls, and eliminating or bypassing the food manifold, allowing the reservoir to outlet food through the outlet valve and therefrom into the bowl. Such a modified structure is more likely to be used in domestic operation as most pet owners have only a single pet animal. Additionally for domestic operation many of the elements may be eliminated, as example the self cleaning type of bowl, the pressurant supply may be replaced by an electrical pump, a manual switch may replace the membrane switch and so on.

Further, in domestic use the assembly is constructed of less durable parts as the unit would receive less use. As example, the container may be formed of stamped aluminum parts, the pressure provided by a BB gun cartridge and the micro-controller can be of the type available for controlling the garden sprinklers that allow for multiple operation within a twenty four hour period. The feed dish and rack may be formed of molded polyethylene plastic.

For the domestic pet owner, it is possible to disassemble the container and sterilize it in the dishwasher. Thereafter at the time of reassembly, just before use, the diaphragm reassembled into the unit and the food paste can be hand packed into both the diaphragm sack and the lower container section before the two reservoir sections are joined. It is anticipated that pet food manufactures would likely make the food paste available in a cellophane wrapped molded shape, refrigerated to retain its shape, that mates with the diaphragm and lower reservoir section shapes. When ready for use, the molded food paste may be inserted into the diaphragm, the wrapper pierced and the underlying reservoir section slid into place and bolted.

It is appreciated that the use of the micro-controller permits unlimited flexibility in controlling and scheduling the dispensing operation.

The foregoing invention has been described in connection with the dispensing of food paste, medicine, and water, which is generically as a "consumable" or as "food". Although medicine and water are not considered foods in the ordinary sense, in the context of this invention they are incorporated within that meaning.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. An automated food dispensing apparatus comprising:
   a container for storing food to be dispensed, said container defining a first portion and a second portion, said first and second portions having cooperating flanges, said first portion of said container defining a gas inlet and said second portion of said container defining a food outlet;
   a rolling diaphragm, said rolling diaphragm having a closed end and an open end and defining a food sack for at least partially holding food, said open end of said rolling diaphragm having a sealing bead adapted and arranged to sealably engage said cooperating flanges of said first and second portions of said container such that said rolling diaphragm is disposed within said first portion of said container when full and said second portion of said container when empty;
   said gas inlet arranged and adapted to admit pressurized gas into said container to telescopically urge said closed end of said diaphragm towards said food outlet relative to said open end of said diaphragm thereby urging food contained in said food sack and said container toward said food outlet.

2. An automated food dispensing apparatus as defined in claim 1, further comprising:
   a stiffening plate, said stiffening plate being fastened to said closed end of said rolling diaphragm for movement integrally therewith.

3. An automated food dispensing apparatus as defined in claim 1, further comprising:
   a first valve for controlling admission of pressurized gas through said gas inlet.

4. An automated food dispensing apparatus as defined in claim 3, further comprising:
   a second valve for controlling opening and closing of said food outlet.

5. An automated food dispensing apparatus as defined in claim 4, further comprising:
   means for automatically controlling said first and second valves.

6. An automated food dispensing apparatus as defined in claim 1 wherein said food comprises an extrudable food paste.

7. An automated food dispensing apparatus as defined in claim 1 further comprising:
   a gas supply for providing a source of pressurized gas to said gas inlet.

8. An automated food dispensing apparatus as defined in claim 5, wherein said automatic control means comprises a microprocessor for scheduling the time for and duration of opening each of said first and second valves, whereby food is automatically dispensed at intervals in accordance with a predetermined schedule.

9. An automated food dispensing apparatus as defined in claim 8, wherein said predetermined schedule sequence of operation can be modified remotely.

10. An automated food dispensing apparatus as defined in claim 1 further comprising:
    a food bowl, said food bowl being adapted to receive food dispensed from said food outlet of said second portion of said container.

11. An automated food dispensing apparatus as defined in claim 10, wherein said food bowl comprises:
    an indicator lamp; and
    a touch responsive switch.

12. An automated food dispensing apparatus as defined in claim 11, wherein said touch responsive switch comprises:
    a flexible operator membrane, said flexible operator membrane being comprised of a material selected from a group consisting of a translucent material and a transparent material which is at least partially optically transmissive, said flexible operator membrane having first and second electrical contacts and being depressible when touched for placing said first electrical contact in electrical communication with said second electrical contact for completing an electrical circuit there through;
    and wherein said indicator lamp is located proximate to said flexible operator membrane for producing illumination responsive to said touch responsive switch.

13. An automated food dispensing apparatus as defined in claim 12, wherein said flexible operator membrane of said touch responsive switch is positioned within said food bowl.

14. An automated food dispensing apparatus as defined in claim 10, wherein said food bowl further comprises:
    a food inlet;
    a solenoid, said solenoid comprising:
        an electromagnetic coil; and
        a plunger centrally positioned in said electromagnetic coil, said plunger translating along an axis of said electromagnetic coil responsive to energization of said electromagnetic coil;
    a passage joint, said passage joint comprising:
        a first passage in fluid communication with said food outlet of said container, said first passage communicating food into said passage joint;
        a second passage for expressing food from said first passage into said food bowl;
        a third passage for guiding movement of said plunger, said third passage being axially aligned with said second passage; and
    said plunger being responsive to energization of said electromagnetic coil for moving through said third and second passages to clear any food from said second passage into said food bowl.

15. An automated food dispensing apparatus comprising:
    a container for storing food to be dispensed, said container defining a gas inlet and a food outlet;
    a rolling diaphragm, said rolling diaphragm having a closed end and an open end and defining a food sack for at least partially holding food, said rolling diaphragm secured within said container so as to divide said container into a gas compartment and a food compartment;
    a stiffening plate fastened to said closed end of said rolling diaphragm for movement integrally therewith; and
    a food-level sensor, said food-level sensor being responsive to said stiffening plate when said food compartment of said container is substantially empty and said stiffening plate is proximate to said food outlet thereby alerting the user to fill said container with food.

16. An automated food dispensing apparatus as defined in claim 15 wherein said food comprises an extrudable food paste.

17. An automated food dispensing apparatus as defined in claim 15 further comprising a microprocessor for automatically opening and closing each of said gas inlet and said food outlet whereby food is dispensed at intervals in accordance with a predetermined schedule.

18. An automated food dispensing apparatus as defined in claim 12 wherein said predetermined schedule can be modified remotely.

19. An automated food dispensing apparatus comprising:

a container for storing food to be dispensed, said container defining a gas inlet and a food outlet;

a rolling diaphragm, said rolling diaphragm having a closed end and an open end and defining a food sack for at least partially holding food, said rolling diaphragm secured within said container so as to divide said container into a gas compartment and a food compartment, said rolling diaphragm being responsive to said gas inlet such that as said gas inlet admits pressurized gas into said gas compartment of said container, said closed end of said rolling diaphragm is telescopically urged towards said food outlet thereby urging the food contained in said food compartment of said container toward said food outlet; and said container defining an inclined groove in fluid communication with said food outlet for facilitating the dispensing of food as said closed end of said rolling diaphragm is urged towards said food outlet.

20. An automated food dispensing apparatus as defined in claim 19 wherein said food comprises an extrudable food paste.

21. An automated food dispensing apparatus as defined in claim 19 further comprising a microprocessor for automatically opening and closing each of said gas inlet and said food outlet whereby food is dispensed at intervals in accordance with a predetermined schedule.

22. An automated food dispensing apparatus as defined in claim 21 wherein said predetermined schedule can be modified remotely.

\* \* \* \* \*

UNITED STATES PATENT AND TRADEMARK OFFICE
CERTIFICATE OF CORRECTION

PATENT NO. : 5,899,367
DATED : May 4, 1999
INVENTOR(S) : Strength et al.

It is certified that error appears in the above-identified patent and that said Letters Patent is hereby corrected as shown below:

Column 13, line 2, "claim 12" should read --claim 17--.

Signed and Sealed this

Fifth Day of October, 1999

*Attest:*

Q. TODD DICKINSON

*Attesting Officer*   Acting Commissioner of Patents and Trademarks